United States Patent [19]

Frenkel

[11] Patent Number: 4,489,753
[45] Date of Patent: Dec. 25, 1984

[54] STRAIGHTWAY VALVE

[76] Inventor: Mark I. Frenkel, ulitsa Karbvsheva, 6, korpus 2, kv. 20, Leningrad, U.S.S.R.

[21] Appl. No.: 385,384
[22] PCT Filed: Sep. 25, 1980
[86] PCT No.: PCT/SU80/00159
§ 371 Date: May 17, 1982
§ 102(e) Date: May 17, 1982
[87] PCT Pub. No.: WO82/01236
PCT Pub. Date: Apr. 15, 1982

[51] Int. Cl.³ .............................................. F16K 15/16
[52] U.S. Cl. .............................. 137/512.15; 137/512.4; 137/857; 251/333; 267/161
[58] Field of Search .............. 137/512.1, 512.15, 512.4, 137/852, 855, 857, 859, 860; 251/333; 267/161, 162

[56] References Cited

U.S. PATENT DOCUMENTS

| 1,632,155 | 6/1927 | Vollmann | 137/512.1 |
| 2,160,401 | 5/1939 | Engleman | 137/512.15 |
| 2,680,916 | 6/1954 | Smith | 137/855 |
| 2,985,188 | 5/1961 | MacDonald | 137/512.1 |
| 3,786,833 | 1/1974 | Frenkel | 137/512.15 |
| 3,823,735 | 7/1974 | Frenkel | 137/512.15 |
| 3,835,883 | 9/1974 | Frenkel | 137/512.1 |
| 3,896,846 | 7/1975 | Zakharzhevsky | 137/512.1 |
| 4,058,138 | 11/1977 | Viktorov et al. | 137/512.1 |

FOREIGN PATENT DOCUMENTS

| 682618 | 3/1964 | Canada | 137/512.15 |
| 21090 | 9/1906 | United Kingdom | 137/855 |
| 480632 | 2/1938 | United Kingdom | 137/857 |
| 1227939 | 4/1971 | United Kingdom . | |
| 421795 | 8/1974 | U.S.S.R. . | |

Primary Examiner—Alan Cohan
Assistant Examiner—John A. Rivell
Attorney, Agent, or Firm—Robert E. Burns; Emmanuel J. Lobato; Bruce L. Adams

[57] ABSTRACT

Disclosed is a straightway valve comprising a housing made from interconnected stiff members, closing members made as toothed plates (10) pinched between the adjacent stiff members. Every toothed plate (10) is made as teeth (11 or 12) having their roots secured to a backing (20).

9 Claims, 5 Drawing Figures

STRAIGHTWAY VALVE

FIELD OF THE INVENTION

The present invention relates to valves, and more particularly to straightway valves.

BACKGROUND OF THE INVENTION

At present industry is in great need of for a substantial increase in the speed of piston compressors along with the retention of their high economic efficiency. Since valves are principal elements determining the resistance in the gas channel or path of the piston compressor and the losses arising therein are the most of the energy losses in the compressor, it is necessary to increase flow sections of the valves without impairing their reliability and increasing the overall dimensions.

Known in the prior art are straightway valves solving this problem, for example the straightway valve in accordance with U.S. Pat. No. 3,786,833 patented in 1974 (selected as a prototype) that comprises a housing made from interconnected stiff members, each still member having on its one side an intake channel and a seat surface arranged opposite the intake channel and a seat of another stiff member, and closing members made as toothed plates pinched between adjacent stiff members of the housing.

This straightway valve allows its flow section to be enlarged without increasing its overall dimensions since the multitooth plate has an extended length of the outlet slot.

However, the multitooth plates are complicated in production since they require a substantial complication of the dies. Furthermore, their production requires a very wide strip of thin thickness, possessing a high strength and a high elasticity. Moreover, because of anisotropy of the strip material a part of the teeth is unfavourably oriented with respect to the direction of rolling. This reduces the strength of the plates and, hence, the reliability of the valve.

In addition, microcracks are developed at the tooth edges during the die forging of the plates. This reduces the service life of the plates and, hence, of the valves as a whole.

The technique of vibration tumbling by means of an abrasive material in a rotating drum is an effective method for strengthening the plates. However, this method of strengthening is unusable for thin multitooth plates weakened by slots between the teeth.

When the pack of valve members is squeezed, small crumplings of the portion of the seat surface are formed, and a shoulder is formed along its border. This shoulder bends the plate teeth towards the limiting surface and causes gas leakages, i.e. leads to a reduction in the valve efficiency.

SUMMARY OF THE INVENTION

The principal object of the invention is to provide a straightway valve wherein the closing members are made so as to increase the efficiency thereof, to improve its reliability, and make it simple to manufacture.

With this principal object in view there is proposed a straightway valve comprising a housing made from interconnected stiff members, each having on its one side an intake channel and a surface in the form of a seat and, on its other side, a limiting surface arranged opposite the intake channel and the seat of another stiff member, and closing members made in the form of toothed plates pinched or clamped between the adjacent stiff members of the housing, wherein in accordance with the invention, each toothed plate is made as teeth secured with their roots to a backing.

The toothed plate made as teeth secured to the backing allows the reliability of the valve to be improved, because it becomes possible to expediently orient the teeth in the direction of rolling and to strengthen them later by vibration tumbling, since the teeth are manufactured separately. The separate teeth and the backing are made by means of simple punching dies. Furthermore, it is possible to unify the teeth to obtain plates of various sizes.

It is advisable to make the backings extending beyond the pinching area towards the seat in order to bias the teeth against the seat.

The backing in the form of a backing plate extending beyond the pinching area towards the seat does not allow the teeth to bend in the direction of the limiting surface, thus preventing leakage of the working medium and enhancing the valve efficiency.

It is advisable that every backing plate be made bent with the edge bearing up against the teeth.

Such a design of the backing structure allows the valve reliability to be improved still further as for as leakage of the working medium is concerned.

BRIEF DESCRIPTION OF THE DRAWINGS

The invention will be better understood from the following description taken in conjunction with the accompanying drawings illustrating a preferred embodiment of the invention, wherein.

BEST MODE TO CARRY OUT THE INVENTION

Figure 1:
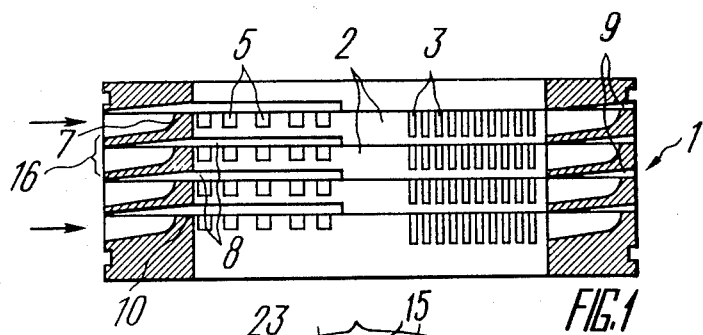
FIG. 1 is a general view of the straightway valve.

Referring now to the accompanying drawings and initially to FIG. 1, the straightway cylindrical suction-discharge valve comprises a housing 1 made from interconnected stiff or rigid members disposed in stacked relationship 2. Each stiff member 2 has on its one side intake channels 3,4 (FIGS. 1,2), discharge channels 5,6 and a surface in the form of a seat 7. On the other side of the stiff member 2 there is a limiting surface made as recesses 8,9. The limiting surface of one stiff member 2 is arranged opposite the intake channels or slots 3,4 and the discharge channels or slots 5,6 of another stiff or rigid member 2. Annular toothed plates 10 have teeth 11,12 pinched between the adjacent stiff members 2 at the roots of the teeth 11,12.

Figure 2:
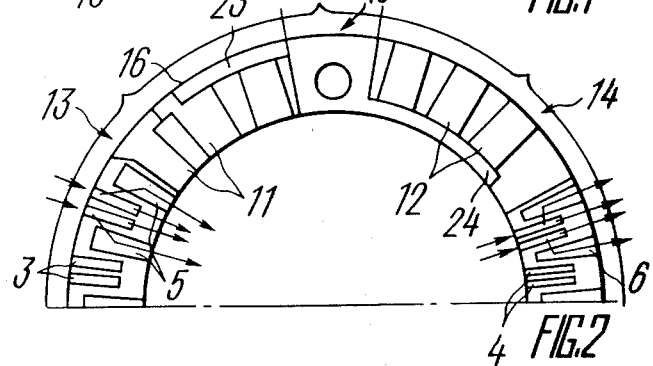
FIG. 2 is a view of FIG. 1 taken along II—II.

The teeth 11,12 of the plate 10 cover the intake channels 3,4 of the seat 7. The discharge channels 5 and 6 are arranged opposite the gaps between the teeth 11, 12. Referring now to FIG. 2, the straightway cylindrical valve is divided along the center plane into two half-cylinders. One of them has a suction sector 13 while the other has a discharge sector 14, separating portions 15 being arranged therebetween.

In the suction sector 13, the intake channels 3 of the stiff members 2 are open from the side of the external surface of an annular member 16, while the discharge channels 5 and the recesses 8 are open from the side of the internal surface. In the discharge sector 14 they are arranged vice versa: the intake channels 4 are open from the side of the internal surface of the annular member 16, while the discharge channels 6 and the recesses 9 are open from the external side. The teeth 11, 12 of the annular plates 10 have their points directed inwards in the suction sector 13, while in the discharge sector 14 they are directed outwards.

Figure 3:
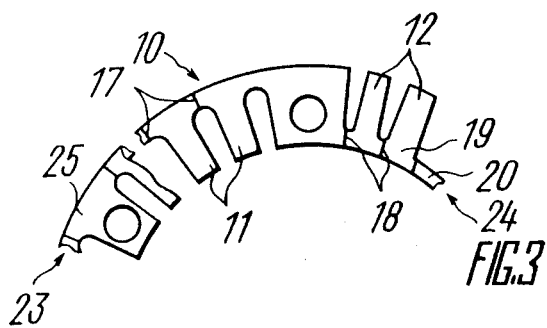
FIG. 3 is a view of an assembled plate from the side of the teeth.

The annular toothed plate 10 (FIG. 3) consists of a set of individual teeth 11 and 12 tightly adjoining each other with edges 17 and 18 at roots 19 by means of which the teeth 11, 12 contact a thin backing plates 20 holding them together in an assembled valve, the plates 10 are arranged in such a manner that the backings 20 face the end faces of the stiff members 2 (FIG. 1) from the side of the limiting surface.

Figure 4:
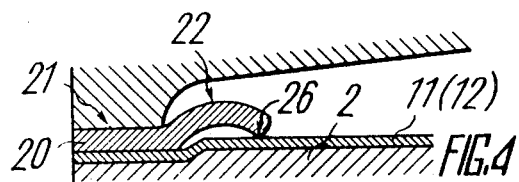
FIG. 4 is a cross-sectional view of FIG. 2 taken along IV—IV.

As to its outline the contour of the backing 20 (FIG. 4) is close to that of a pinching area 21, but does not faithfully follow it and has an edge 22 extending above the recesses 8 and 9 by one tenth of the free length of the teeth to permit the plate to bend.

It is provided that the blanks of the teeth 11, 12 of the plate 10 (FIG. 3) are subjected, prior to fastening to the backing 20, to the vibration tumbling for their strengthening, deburring and rounding of the edges. Then the side edges 17 and 18 of the teeth 11, 12 assembled in stacks undergo grinding to obtain the tight mating of the teeth 11, 12. In so doing, the size and the angle between the edges are changed, allowing to assemble the plates 10 from similar blanks of the teeth 11, 12 for valves of different diameter.

According to another embodiment, the plate 10 of the valve is made from the elements consisting of several, for example two, three and over, teeth fastened to the backing in place of the individual teeth 11, 12, whereby the tightness of the valve is improved, but a number of the advantages mentioned hereinabove and achieved with the plates having individual teeth is lost. The essence of such an embodiment is evident from the above description.

The teeth 11, 12 are joined to the backing 20 by welding along the plate of pinching of the plate 10 between the stiff members 2.

It is important that the connection of the teeth 11, 12 with the backing 20 does not require a high strength since under the service conditions they are additionally fastened by the force that presses the valve members to each other.

The plate 10 consisting of individual teeth 11, 12 fastened to the backing 20 may be made with thinner teeth 11, 12 in the suction sector 13 and with thicker ones in the discharge sector 14 (FIG. 2), the difference in thickness being compensated by different thickness of two regions 23 and 24 of the backing 20.

The total thickness of the teeth 11, 12 and the backing 20 is equal for every plate 10 throughout the whole area of their pinching. The difference in stiffness of the teeth 11, 12 of the plate 10, substantially increases the efficiency of the valve.

The assembled plates of individual cylindrical valves—suction and discharge ones—have the design similar to that of the plates of combined valves, that is of suction—discharge ones. They also consist of teeth secured to the backing. The backing of these plates has the shape of a continuous ring of small width, arranged at the external edge of the plate for the suction valves, and at the internal edge of the plate for the discharge valves, all teeth secured thereto have their points directed inwards for the first ones, and outwards for the second ones.

The backing 20 of the plate 10 of the individual valves is provided with radial tongues 25 (FIG. 3) directed inwards in the suction channels and outwards in the discharge channels with respect to the plate. The tongues are used to fix the plate 10 with respect to the stiff member and are provided with bores for the screws fastening the pack of ring members, the tongues clamped between the stiff seats and lift limiting means being completely stationary in the assembled valve.

Figure 5:
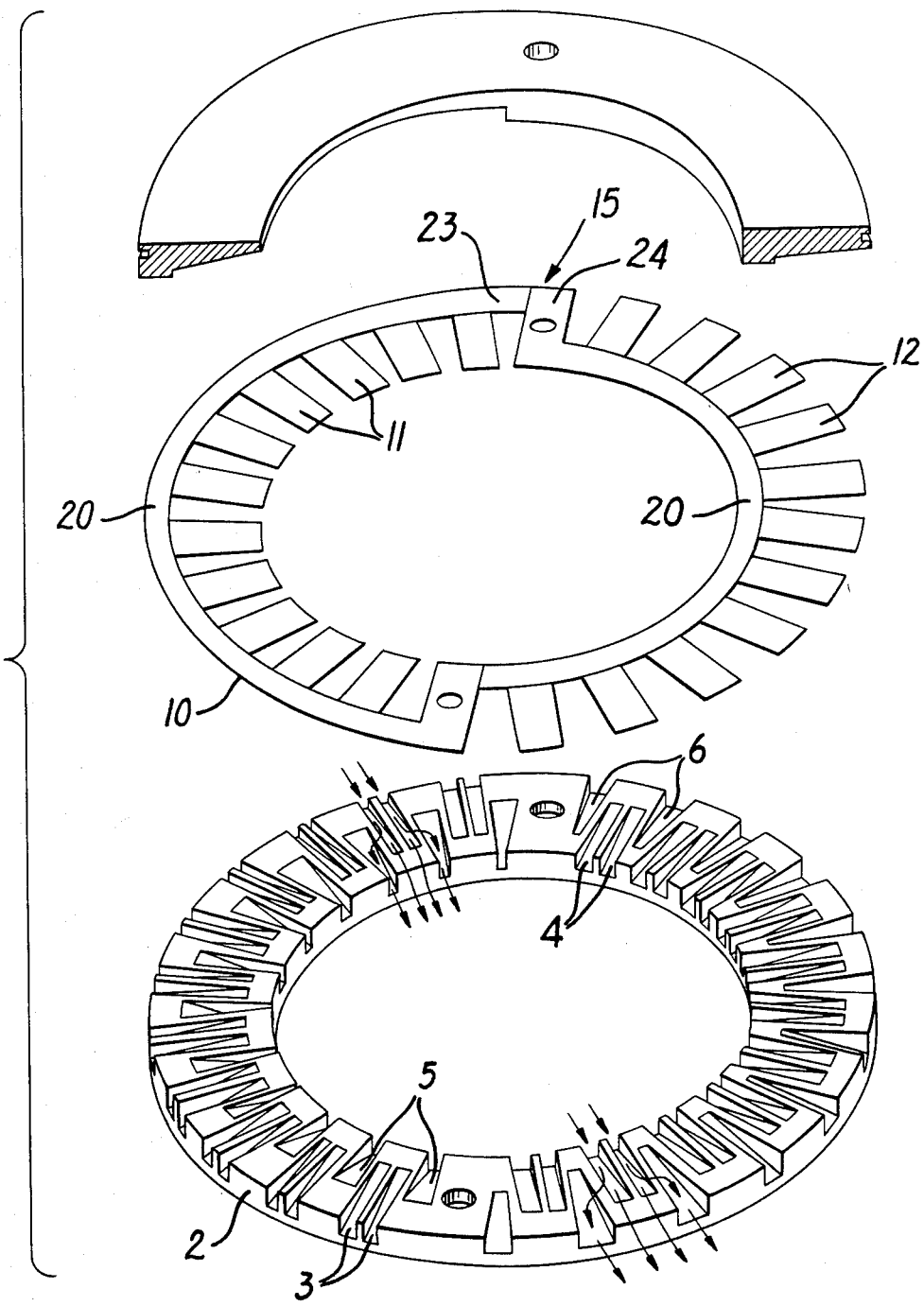
FIG. 5 is an exploded view of components of the valve illustrated in FIGS. 1 and 2.

It is advisable to bend the backing 20 towards the teeth 11, 12; the rim of this edge 26 (FIG. 4) presses the teeth of the plate 10 against the plane of the valve seat 7 (FIG. 1) and prevents their bulging-out. FIG. 5 illustrates a top cover of the valve and a plate assembled from individual teeth 11 and 12 fastened on the backing plate 20 and the rigid member 2 with the channels 5 and 6. The backing 20 has projections 24 and the plate 10 also with openings as shown that register in assembly with the holes shown in the rigid member 2 as shown.

The present invention covers not only the cylindrical valves but also the flat straightway valves of round and rectangular shapes with stiff prismatic-type elements and with toothed plates pinched therebetween along a U-shaped outline.

The shape and sizes of the movable portion of the teeth being similar, the assembled plates of the flat straightway valves can be manufactured from blanks similar to those of the assembled ring plates of the cylindrical valves.

The straightway valves manufactured in accordance with the present invention operate as follows. Under the action of the excessive pressure in the space ahead of the valves as compared to the pressure behind the valve (in the combined valves it arises at the suction and discharge sides at different times) the teeth 11, 12 of the plate 10 are bent inside the recesses 8, 9 of the limiting surface, whereby the slots determining the degree of the valves opening are formed between the teeth 11, 12 and the seat 7 along the perimeter of the teeth 11, 12. As the intensity of the flow is increasing, the pressure difference enhances and the lift of the teeth 11, 12 of the plate 10 increases, but is reducing as the intensity of the flow falls. As it reaches zero, it reverses its sign. Under the action of the negative pressure difference the plates 10 are pressed against the seat 7, preventing the gas flow from reverse movement through the valve.

Under the compressor operating conditions, the thin plate 10 of the straightway valve is periodically loaded with a pressure difference perceived by the valve after it is closed and acting on the plate 10 in the direction from the limiting surface of the seat 7. It bends the plate 10 inside the intake channels 3,4, and local segment-like slots (not shown) are formed at these regions along the pinching edges of the plate 10. They are also one of the principal causes of the looseness of the straightway valve and of the leakage of the working medium that are the stronger the thinner is the plate 10 and the deeper is its deflection. The sag is inversely proportional to the third power of the thickness of the plate 10. Hence, the use of the backing 20 that substantially increases the total thickness of the plate 10 reduces by far the size of the slots. The leakage is reduced still more since it is, in turn, inversely proportional to the third power of the width of the slots (with the laminar cross-section) for slots of small width. Thus, the valve in accordance with the present invention makes it also possible to improve the tightness thereof along the edges of pinching of the plates 10.

The operation of the valve in accordance with the present invention is characterized by modified fixation of the teeth 11, 12 secured to the backing 20 and pressed against the seat 7 by the edge 26. The action of the rim of the edge 26 manifests in the fact that at the zero pressure difference at the valve, the teeth 11, 12 of the plate 10 perceive the force making them to lie down tightly on the surface of the seat 7. This eliminates the buldging-out of the teeth 11, 12 in the unloaded valve, the closing of the valve is not delayed, and the reverse leakage of the working medium is avoided, with otherwise stop only after the valve is "slam shut" by the back flow.

Owing to the stiffness of the substrate 20, the cyclically repeated deflection of the thin valve plates 10 inside the intake channels 3, 4 in the seat 7 of the valve is reduced as well as the leakage through the segment-like slots formed along the pinching lines of the plates 10.

The features mentioned hereinabove of the operation of the proposed valves improve their efficiency. This manifests in an increased capacity of the compressors equipped with such valves and in the decrease in specific energy consumption.

The diagram of movement of the elastic valve plates under the operating conditions in a compressor depends directly upon the stiffness of the springing parts of the plate 10, that is upon the thickness of the teeth 11, 12. A premature closing of the valve occurs as the stiffness increases and a delay takes place as it decreases. The cylindrical straightway suction-discharge valves with the stiff annular members 2 and the assembled plates 10 arranged therein, made in accordance with the present invention, allows to provide the teeth 11, 12 of difference thickness on the suction and discharge sides, thereby providing the operation of the valve under optimal conditions when the valve is closed without a substantial lead or leg and is completely open at a reduced pressure difference.

INDUSTRIAL APPLICABILITY

Most advantageously the straightway valve can be used for high-speed reciprocating compressors of low and middle-pressure and first stages of high-pressure compressors.

What is claimed is:

1. A straightway intake-and-discharge valve for compressor and the like comprising;
a plurality of rigid plates assemable in stacked relationship in assembly defining a housing, each rigid plate having a plurality of peripheral intake channels extending from a peripheral outer side a limited extent into a first portion of a body of the rigid plate and spaced along a length direction thereof and each intake channel opening to a surface of a common wall disposed spaced along the length thereof for positioning in said assembly opposed to a next adjacent stacked rigid plate, each rigid plate having a plurality of peripheral discharge channels extending from a peripheral outer side a limited extent into a second portion of the body of the corresponding rigid plate spaced along a length direction thereof and each opening to said common wall along the second portion, each rigid plate having a peripheral recess extending along a wall surface disposed opposed when in the assembly to the surface of said common wall of the next adjacent stacked rigid plate and disposed respectively in registry with the intake and discharge channel openings respectively of said next adjacent rigid plate of the assembly of stacked rigid plates, each rigid plate having peripheral channels extending from an inner side of the first portion and second portion a limited extent into the body of the first portion and the second portion thereof and each opening to said common wall at the respective portion in registry with a respective one of said recesses of a next adjacent rigid plate in said assembly, valve plates positioned in the assembly of stacked rigid plates between the adjacent stacked rigid plates and having elastic teeth overlying the openings of said intake channels defining valve elements for opening and closing said openings of the peripheral intake channels of the peripheral outer side of the first portion, other valve plates having elastic teeth overlying the openings of the discharge channels defining valve elements for opening and closing said openings of the peripheral discharge channels of said second portion of the corresponding rigid plate, the adjacent rigid plates of the housing clamping roots of the teeth therebetween, backing plates to which roots of groups of teeth of said valve plates are secured disposed clamped with the roots of said teeth and having spaced tongues in registry with said teeth extending overlying respective individual teeth of the valve plates and arcuate in a length direction at a free end-edge thereof having an edge bearing on a corresponding tooth adjacent the root thereof, the elastic teeth being disposed for flexing in spaces defined by corresponding ones of said recesses and the individual surfaces of the common walls of the individual rigid plates to which the corresponding channels open thereby to function as valve elements opening and closing the intake and discharge channel openings in response to pressure differentials to effect fluid pressure flows through the channels effected by suction and pressure variations internally of the housing, and the intake and the discharge channels of the outer side of each portion being out of registry with the channels extending into the first and second portion from the inner side.

2. A straightway intake-and-discharge valve for compressors and the like according to claim 1, in which the rigid plates are annular and the first portion and second portion each define a semicircle thereby defining an annular cylindrical housing by said stacked assembly, the periheral intake channels of the outer side of said first portion being greater in number that the peripheral channels of the inner side of said first portion, and the peripheral channels of the inner side of the second portion being greater in number than the peripheral discharge channels of the outer side of the second portion.

3. A straightway intake-and-discharge valve for compressors and the like according to claim 1, in which each of said rigid plates are annular defining an annular housing, and in which the first portion and the second portion of the rigid plates each define a semicircle.

4. A straightway intake-and-discharge valve for compressors and the like according to claim 3, in which said teeth and the corresponding tongues are disposed in an annular configuration.

5. A straightway intake-and-discharge valve for compressors and the like according to claim 1, in which the intake channels are grouped and comprise at least one group with the intake channels adjacent each other in a sequence, and in which the discharge channels are grouped and comprise at least one group having the discharge channels next adjacent to each other in a sequence, and in which individual groups of channels are disposed in sequence.

6. A straightway intake-and-discharge valve for compressors and the like according to claim 1, in which the intake channels have a different cross section dimension than the discharge channels.

7. A straightway intake-and-discharge valve for compressors and the like according to claim 1, in which said common wall surface of the individual rigid plates define seats on which said teeth seat to close the respective channels, and in which surfaces defining said recesses limit the extent of elastic flexure movement of the individual elastic teeth off of the corresponding seats.

8. A straightway intake-and-discharge valve for compressors and the like, according to claim 1 in which the rigid plates are annular and in which the teeth are disposed in an annular arrangement, in which the intake channels define intake ports on an outer periphery of the housing and the discharge channels define discharge ports on an outer periphery of the housing.

9. A straight intake-and-discharge valve for compressors and the like comprising, a plurality of rigid plates assemblable in stacked relationship defining a housing, said rigid plates each having a plurality of peripheral channels disposed extending into a body thereof defining a group of intake channels and a separate group of discharge channels, the peripheral channels extending from sides a limited extent into a body of the individual rigid plate and open to a surface of a common wall disposed when the rigid plates are stacked opposed to a next adjacent stacked rigid plate, each rigid plate having peripheral recesses extending along a wall surface disposed when in assembly with other rigid plates opposed to the surface of said common wall of the next adjacent rigid plate with said recesses in registry with the channels thereof, a plurality of valve plates having elastic teeth defining valve elements overlying the channel openings of each said common surface for opening and closing the channels by flexure in said recesses in response to fluid pressure differentials across the rigid plates and thereby said channels, backing plates to which the roots of said teeth of said valve plates are secured, and the backing plates and valve plates secured in assembly thereon are clamped at roots of said teeth between next adjacent rigid plates when in said assembly, said backing plates having a plurality of tongues extending therefrom in registry with corresponding teeth, and said tongues being arcuate in a length direction at a free end with an edge bearing on a corresponding tooth adjacent a root thereof.

* * * * *